(12) United States Patent
Kao et al.

(10) Patent No.: US 7,545,539 B2
(45) Date of Patent: Jun. 9, 2009

(54) APPARATUS AND METHOD FOR ADJUSTING SHARPNESS OF IMAGE

(75) Inventors: Hsu-Pin Kao, Pingjhen (TW); Tsan-Hung Tsai, Sanchong (TW); Yi-Chia Shan, Jhongli (TW); Kai-Hsiang Hsu, Tucheng (TW); Hsu-Chia Kao, Pingjhen (TW)

(73) Assignee: Marketech International Corp., Taipei (TW)

( * ) Notice: Subject to any disclaimer, the term of this patent is extended or adjusted under 35 U.S.C. 154(b) by 597 days.

(21) Appl. No.: 11/454,977

(22) Filed: Jun. 19, 2006

(65) Prior Publication Data

US 2007/0177217 A1 Aug. 2, 2007

(30) Foreign Application Priority Data

Jan. 27, 2006 (TW) .................................. 95103377

(51) Int. Cl.
*H04N 1/409* (2006.01)
*G06T 5/00* (2006.01)

(52) U.S. Cl. ..................... 358/3.21; 358/3.27; 382/261; 382/266; 382/274

(58) Field of Classification Search ................ 358/1.9, 358/3.01, 3.21, 3.22, 3.26, 3.27, 532, 447, 358/448, 461, 466; 382/254, 260, 261, 263, 382/266, 269, 270, 273, 274; 345/589, 611, 345/617
See application file for complete search history.

(56) References Cited

U.S. PATENT DOCUMENTS

| | | | | |
|---|---|---|---|---|
| 5,481,376 A | * | 1/1996 | Kawashima | ................ 382/274 |
| 6,016,370 A | * | 1/2000 | Hatakeyama et al. | ....... 382/299 |
| 7,463,785 B2 | * | 12/2008 | Ebisawa | .................... 382/266 |
| 2008/0118176 A1 | * | 5/2008 | Li et al. | .................... 382/274 |

* cited by examiner

*Primary Examiner*—Scott A Rogers
(74) *Attorney, Agent, or Firm*—Birch, Stewart, Kolasch & Birch, LLP (57) ABSTRACT

A method for adjusting a target gray level of a target pixel based on a spatial mask is provided. The target pixel is surrounded with N adjacent pixels; each of the N adjacent pixels respectively has an adjacent gray level. The method first multiplies the target gray level with a sharpness index to generate an amplified target gray level and respectively multiplies each of the adjacent gray level with an adjacent index to generate N modified adjacent gray levels. Then, the amplified target gray level and the N modified adjacent gray levels are added up to generate a first gray level sum. The method multiplies the first gray level sum with a multiplying parameter to generate a second gray level sum. At last, the method divides the second gray level sum by a dividing parameter to generate an adjusted gray level for the target pixel.

22 Claims, 7 Drawing Sheets

FIG. 1(A)

| A | B | C |

FIG. 1(B)

| -1 | 4 | -1 |

FIG. 1(C)

| -1 | 6 | -1 |

FIG. 1(D)

| -1 | 10 | -1 |

| A | B | C | D | E |

FIG. 2(A)

| -1 | -1 | 8 | -1 | -1 |

FIG. 2(B)

| A | B | C |
| D | E | F |
| G | H | I |

FIG. 3(A)

| 0 | -1 | 0 |
| -1 | 8 | -1 |
| 0 | -1 | 0 |

APPARATUS AND METHOD FOR ADJUSTING SHARPNESS OF IMAGE

BACKGROUND OF THE INVENTION

1. Field of the Invention

This invention is related to image processing methods and apparatuses. More specifically, this invention is related to methods and apparatuses for sharpening images.

2. Description of the Prior Art

Sharpening an image is adjusting the gray levels of pixels in the image, so as to increase differences between gray levels of adjacent pixels. Generally speaking, enhancing sharpness can make an image clearer and brighter. Most image processing methods perform a sharpening step with a spatial mask. During the process of sharpening, the gray levels of pixels within the spatial mask are respectively multiplied with by a particular weighting and further processed.

Figure 1A:
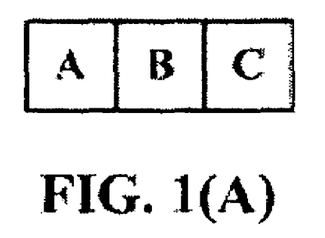
FIG. 1(A) shows three pixels A, B and C on the same horizontal line in one image.
Figure 1B:
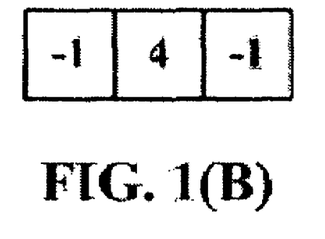
FIG. 1(B) through FIG. 1(D) show several spatial masks can be applied to the pixels in FIG. 1(A).

Please refer to FIG. 1. FIG. 1(A) shows three pixels A, B and C on the same horizontal line in one image. FIG. 1(B) through FIG. 1(D) show several spatial masks can be applied to the pixels in FIG. 1(A). Assume the gray levels of pixels A, B and C are G1, G2 and G3, respectively. After being sharpened with the spatial mask in FIG. 1(B), the new gray level (G2') of pixel B is:

$$G2' = \frac{1}{2}(4*G2 - G1 - G3); \quad \text{(Equation 1)}$$

Figure 1C:
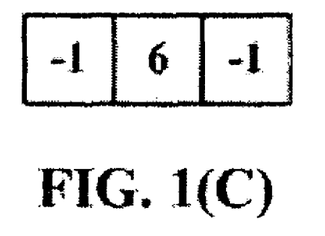

After being sharpened with the spatial mask in FIG. 1(C), the new gray level (G2') of pixel B is:

$$G2' = \frac{1}{4}(6*G2 - G1 - G3); \quad \text{(Equation 2)}$$

Figure 1D:
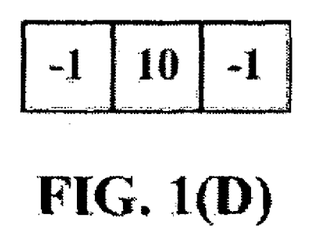

The rest may be deduced by analogy. After being sharpened with the spatial mask in FIG. 1(D), the new gray level (G2') of pixel B is:

$$G2' = \frac{1}{8}(10*G2 - G1 - G3). \quad \text{(Equation 3)}$$

The spatial mask in FIG. 1(B) can be represented as (½)×[−1 4−1]; the spatial mask in FIG. 1(C) can be represented as (¼)×[−1 6−1]; the spatial mask in FIG. 1(D) can be represented as (⅛)×[−1 10−1].

Different spatial masks correspond to different sharpening effects. For example, adopting the spatial mask shown in FIG. 1(B) can generate a sharper image. On the contrary, adopting the spatial mask shown in FIG. 1(D) generates a less sharp image. That is to say, to arrange the spatial masks in sequence according to their corresponding sharpening effects has the result: FIG. 1(B)>FIG. 1(C)>FIG. 1(D).

Figure 2A:
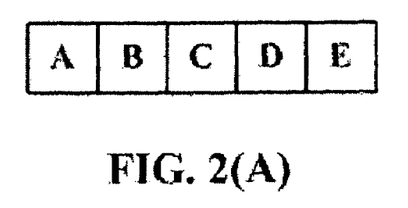
FIG. 2(A) shows five pixels A, B, C, D and E on the same horizontal line in one image.
Figure 2B:
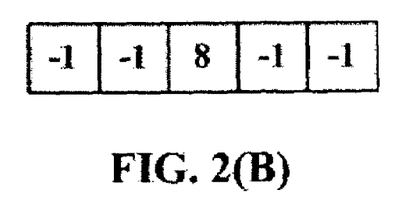
FIG. 2(B) shows a spatial mask can be applied to the pixels in FIG. 2(A).

Please refer to FIG. 2. FIG. 2(A) shows five pixels A, B, C, D and E on the same horizontal line in one image; FIG. 2(B) shows a spatial mask can be applied to the pixels in FIG. 2(A). Assume the gray levels of pixels A, B, C, D and E are G1, G2, G3, G4 and G5, respectively. After being sharpened with the spatial mask in FIG. 2(B), the new gray level (G3') of pixel C is:

$$G3' = \frac{1}{4}(8*G3 - G1 - G2 - G4 - G5). \quad \text{(Equation 4)}$$

Figure 3A:
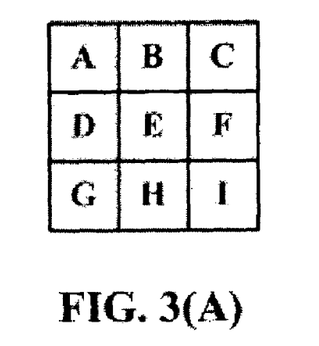
FIG. 3(A) shows nine adjacent pixels A~I in one image.
Figure 3B:
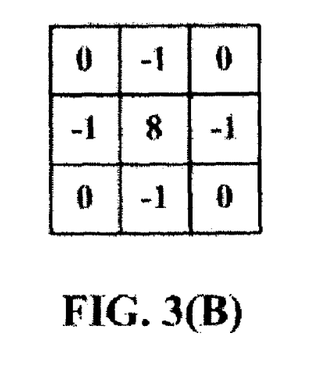
FIG. 3(B) shows a spatial mask can be applied to the pixels in FIG. 3(A).

A spatial mask can also be a two-dimension matrix shown in FIG. 3(B). Assume the gray levels of pixels A~I in FIG. 3(A) are G1~G9, respectively. After being sharpened with the spatial mask in FIG. 3(B), the new gray level (G5') of pixel E is:

$$G5' = \frac{1}{4}(8*G5 - G2 - G4 - G6 - G8). \quad \text{(Equation 5)}$$

If an image processing process performs sharpening with digital circuits, designers usually set the divisor in the sharpening equations equal to a power of 2, so as to simplify the circuits and increase calculating efficiencies. For example, the divisors in the aforementioned equations are set equal to 2, 4 and 8.

Although setting the divisor equal to a power of 2 can simplify digital circuits, the flexibility of sharpening levels is decreased. For instance, because 5, 6 and 7 are not powers of 2, three possible spatial masks, (⅕)×[−1 7−1], (⅙)×[−1 8−1], and (1/7)×[−1 9−1], are not used in prior arts.

Figure 4A:
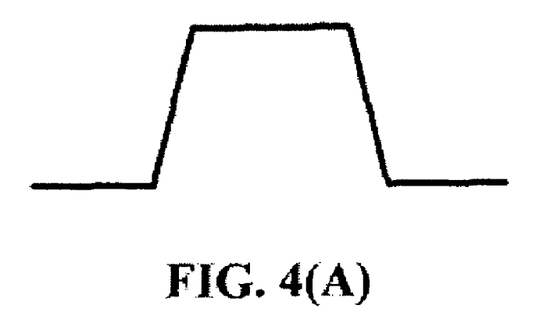
FIG. 4 shows ideal and actual sharpened results.
Figure 4B:
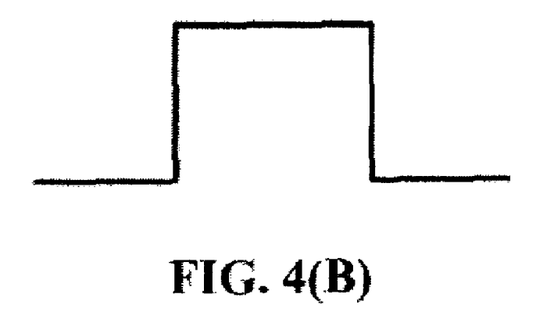
Figure 4C:
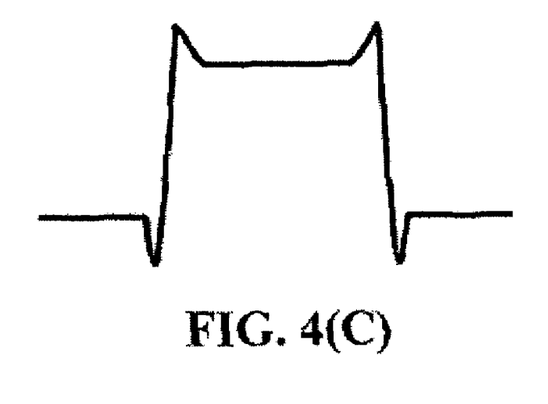

Besides, most images contain clearer parts and obscurer parts at the same time. That is to say, some parts have higher sharpness and some parts have lower sharpness. If a single spatial mask is used to adjust such an image, the edges of parts with higher sharpness may have abnormal side effects. Please refer to FIG. 4, which illustrates ideal and actual sharpened results. FIG. 4(A) shows the gray levels on the same horizontal line in one image before sharpening; FIG. 4(B) shows the gray levels as an ideal sharpened result; FIG. 4(C) shows the gray levels as an actual sharpened result. As shown in FIG. 4(C), the over-shootings at the corners are side effects that seriously decrease image qualities.

SUMMARY OF THE INVENTION

To solve the aforementioned problems, this invention provides methods and apparatuses for adjusting a target gray level of a target pixel based on a spatial mask. The target pixel is surrounded with N adjacent pixels, wherein N is a positive integer. Each of the N adjacent pixels respectively has an adjacent gray level.

One preferred embodiment according to this invention is an image adjusting method. The method first multiplying the target gray level with a sharpness index to generate an amplified target gray level and respectively multiplying each of the adjacent gray levels with an adjacent index to generate N modified adjacent gray levels, wherein the sharpness index and the adjacent index are related to the spatial mask. Subsequently, the method adds up the amplified target gray level and the N modified adjacent gray levels to generate a first gray level sum. The method then multiplies the first gray level sum with a multiplying parameter to generate a second gray level sum, wherein the multiplying parameter is related to the spatial mask. Finally, the method divides the second gray level sum by a dividing parameter to generate an adjusted gray level for the target pixel, wherein the dividing parameter is related to the spatial mask.

The other preferred embodiment according to this invention is an image adjusting apparatus including a first multiplying module, an adding module, a second multiplying module and a dividing module. The first multiplying module is used for multiplying the target gray level with a sharpness index to generate an amplified target gray level and respectively multiplying each of the adjacent gray levels with an adjacent index to generate N modified adjacent gray levels, wherein the sharpness index and the adjacent index are related to the spatial mask. The adding module is used for adding up the amplified target gray level and the N modified adjacent gray levels to generate a first gray level sum. The second multiplying module is used for multiplying the first gray level sum with a multiplying parameter to generate a second gray level sum, wherein the multiplying parameter is related to the spatial mask. The dividing module is used for dividing the second gray level sum by a dividing parameter to generate an adjusted gray level for the target pixel, wherein the dividing parameter is related to the spatial mask.

Because this invention changes one divisor into the combination of a multiplying parameter and a dividing parameter, the divisor in sharpening equations are not limited to powers of 2. Accordingly, this invention can provide various and more flexible sharpening levels.

The advantage and spirit of the invention may be understood by the following recitations together with the appended drawings.

DETAILED DESCRIPTION OF THE INVENTION

This invention provides methods and apparatuses for adjusting a target gray level of a target pixel based on a spatial mask. The target pixel is surrounded with N adjacent pixels, wherein N is a positive integer. Each of the N adjacent pixels respectively has an adjacent gray level. As the example shown in FIG. 1(A), pixel B is the target pixel, and pixels A and C are two adjacent pixels. N is equal to 2 in this example. Furthermore, G2 is the target gray level, and G1 and G3 are adjacent gray levels. Assume the sharpening equation of the spatial mask is:

$$G2' = \frac{1}{k}[(k+2)*G2 - G1 - G3]. \quad \text{(Equation 6)}$$

k is an adjustable sharpening level. Different k corresponds to different spatial masks; a smaller k is corresponding to a higher sharpening effect. Assuming k ranges from 1 to 32, and then there are 32 candidate spatial masks can be used to sharpen the target gray level. Besides, the value (k+2) can be defined as a sharpness index, and the value (−1) multiplied to G1 and G3 can be defined as an adjacent index.

According to this invention, the divisor k in Equation 6 can be represented as the combination of a multiplying parameter M and a dividing parameter D:

$$\frac{1}{k} = \frac{M}{D}, \quad \text{(Equation 7)}$$

Therefore, Equation 6 can be re-written as:

$$G2' = \frac{M}{D}[(k+2)*G2 - G1 - G3], \quad \text{(Equation 8)}$$

In actual applications, the dividing parameter D can be set as a power of 2, for instance, 512. The multiplying parameter M can be changed according to the divisor k selected by users. Assume the divisor k ranges from 1 to 32. A look-up table can be previously provided for storing the 32 multiplying parameters M respectively correspond to the 32 candidate spatial masks.

Please refer to Table 1, which is an example of the look-up table. In this example, the adjacent index is set as (−1) and the dividing parameter D is equal to 512. Every divisor k is corresponding to a particular multiplying parameter M, thus the multiplying parameters M includes 32 multiplying parameters M.

TABLE 1

Look-up table of divisor k and multiplying parameter M

| k | M |
|---|---|
| 1 | 512 |
| 2 | 256 |
| 3 | 170 |
| 4 | 128 |
| 5 | 102 |
| 6 | 85 |
| 7 | 73 |
| 8 | 64 |
| 9 | 56 |
| 10 | 51 |
| 11 | 46 |
| 12 | 42 |
| 13 | 39 |
| 14 | 36 |
| 15 | 34 |
| 16 | 32 |
| 17 | 30 |
| 18 | 28 |
| 19 | 26 |
| 20 | 25 |
| 21 | 24 |
| 22 | 23 |
| 23 | 22 |
| 24 | 21 |

TABLE 1-continued

Look-up table of divisor k and multiplying parameter M

| k | M |
|---|---|
| 25 | 20 |
| 26 | 19 |
| 27 | 18 |
| 28 | 18 |
| 29 | 17 |
| 30 | 17 |
| 31 | 16 |
| 32 | 16 |

Users can select one spatial mask from these candidate spatial masks. In actual applications, each of the candidate spatial masks respectively corresponds to a candidate sharpness index, a candidate adjacent index, a candidate multiplying parameter, and a candidate dividing parameter. The look-up table is used for storing the candidate sharpness indexes, the candidate adjacent indexes, the candidate multiplying parameters and the candidate dividing parameters. After deciding the sharpening level k, this invention can find out the corresponding indexes and parameters.

As known by those skilled in this art, when the divisor of a dividing circuit is not equal to a power of 2, the digital circuit is very complicated. On the contrary, to implement a dividing circuit with the divisor equal to a power of 2 is easier. This invention changes the divisor k into the combination of a multiplying parameter M and a dividing parameter D. The dividing parameter D can still be a power of 2, and the choice of the multiplying parameter M is very flexible. Accordingly, the dividing circuit of this invention is much simpler than prior arts.

Figure 5:
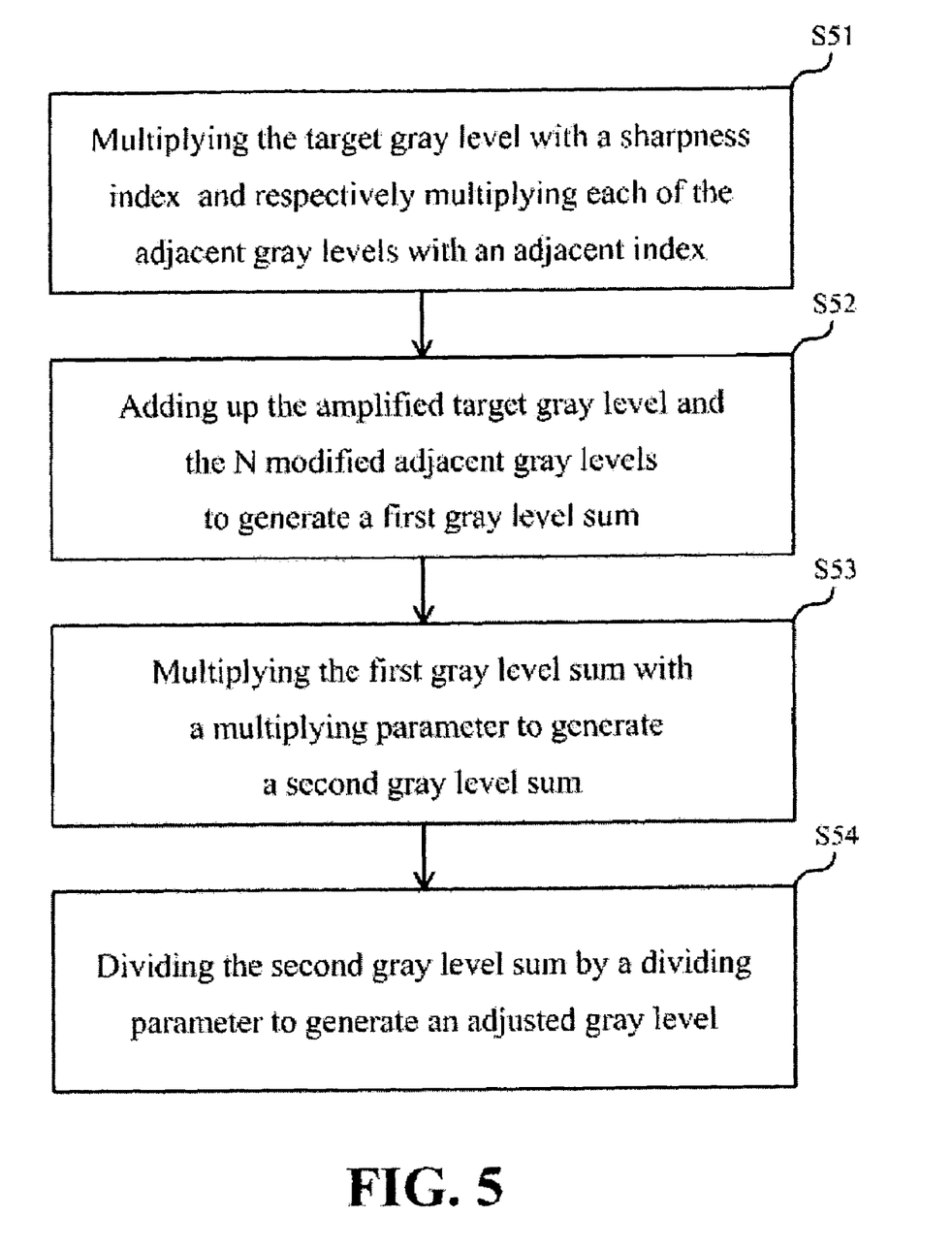
FIG. 5 illustrates the flowchart of the first preferred embodiment according to this invention.

The first preferred embodiment according to this invention is an image adjusting method. FIG. 5 illustrates the flowchart of this image adjusting method. Step S51 is first performed to multiply the target gray level with a sharpness index to generate an amplified target gray level and to respectively multiply each of the adjacent gray levels with an adjacent index to generate N modified adjacent gray levels, wherein the sharpness index and the adjacent index are related to the spatial mask. Step S52 is adding up the amplified target gray level and the N modified adjacent gray levels to generate a first gray level sum. Subsequently, step S53 is performed to multiply the first gray level sum with a multiplying parameter to generate a second gray level sum, wherein the multiplying parameter is related to the spatial mask. In step S54, the method divides the second gray level sum by a dividing parameter to generate an adjusted gray level for the target pixel, wherein the dividing parameter is related to the spatial mask.

Taking Equation 8 as an example, the sharpness index is (k+2), the adjacent index is (−1), the amplified target gray level is (k+2)*G2, the two modified adjacent gray levels are (−1)*G1 and (−1)*G3, the first gray level sum is [(k+2)*G2−G1−G3], the second gray level sum is M*[(k+2)*G2−G1−G3], and the adjusted gray level is equal to G2' in Equation 8.

In actual applications, the sharpness index and the adjacent index in step S51, the multiplying parameter in step S53 and the dividing parameter in step S54 are selected from the look-up table according to the spatial mask. Generally, the adjacent index and the dividing parameter are constants.

Figure 6:
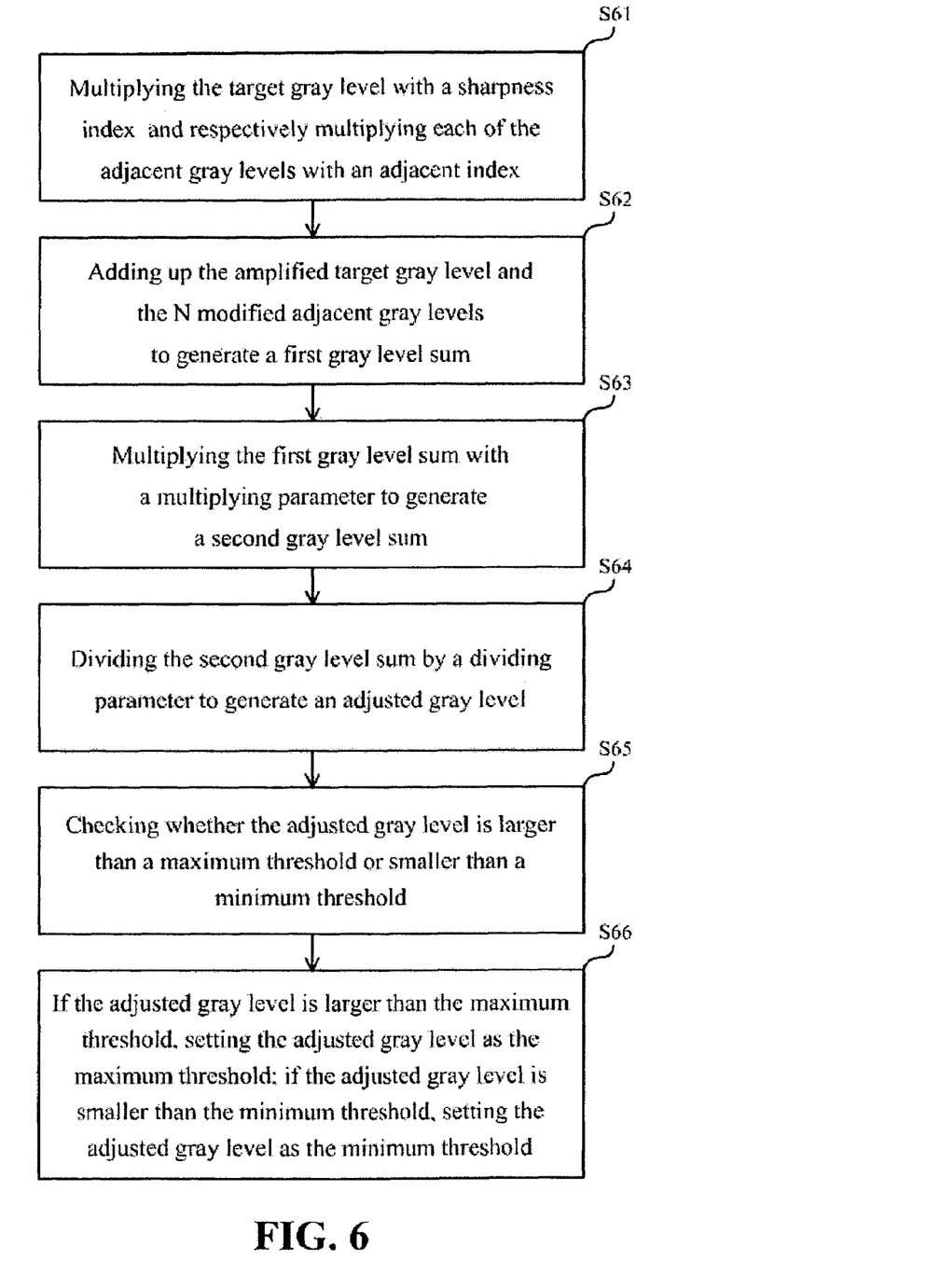
FIG. 6 illustrates the flowchart of the second preferred embodiment according to this invention.

To lessen side effects after sharpening processes, this invention can further include steps for adjusting abnormal gray levels. The second preferred embodiment according to this invention is such an image adjusting method. FIG. 6 shows the flowchart of this method. Steps S61 through S64 are the same as steps S51 through S54. Step S65 is checking whether the adjusted gray level is larger than a maximum threshold or smaller than a minimum threshold. In step S66, if the adjusted gray level is larger than the maximum threshold, the adjusted gray level is set as the maximum threshold; if the adjusted gray level is smaller than the minimum threshold, the adjusted gray level is then set as the minimum threshold.

The maximum threshold and the minimum threshold are relative to the original gray level and the N adjacent gray levels. For example, assume $K_{max}$ and $K_{min}$ are respectively the maximum and minimum gray levels among the target gray level and the N adjacent gray levels. Then, the maximum threshold can be set as $[(1+C)*K_{max}]$ and the minimum threshold can be set as $[(1-C)*K_{min}]$, wherein C is a limitation parameter relative to the original gray level and the N adjacent gray levels. The limitation parameter C can be determined by designers or users based on requests for clearness, brightness, colors, and watching distances.

Figure 7A:
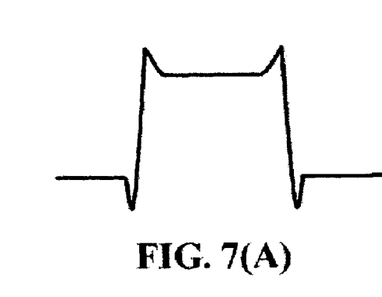
FIG. 7 shows the sharpened results before and after the adjusting step according to this invention.
Figure 7B:
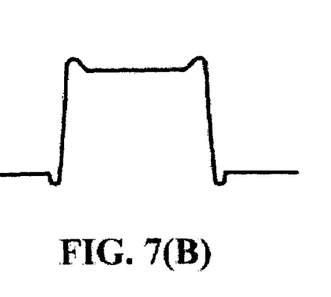

FIG. 7 shows the sharpened results before and after the adjusting step according to this invention. FIG. 7(A) shows the gray levels on the same horizontal line in one image after sharpening; FIG. 7(B) shows the gray levels after sharpening and the aforementioned adjusting steps. As shown in FIG. 7(B), side effects in FIG. 7(A) can be lessened according to this invention.

Figure 8:
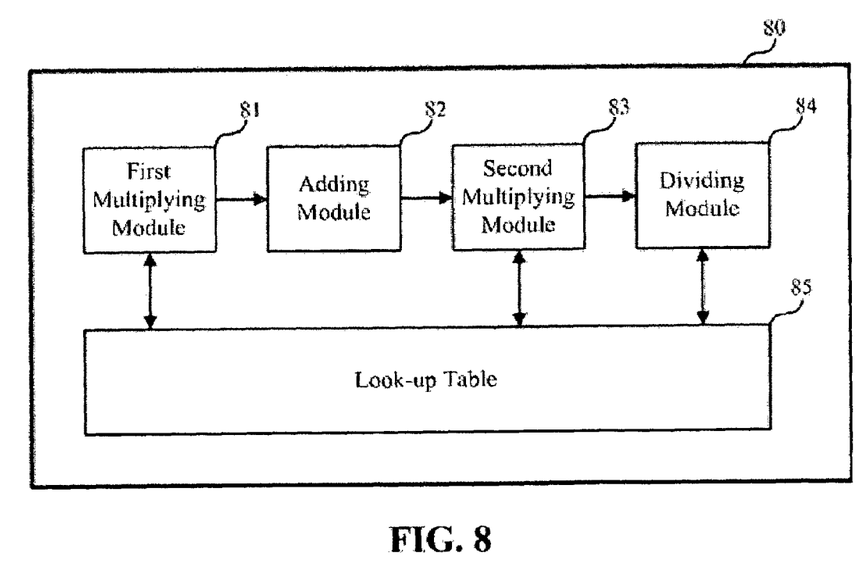
FIG. 8 illustrates the block diagram of the third preferred embodiment according to this invention.

The third preferred embodiment according to this invention is an image adjusting apparatus. FIG. 8 illustrates the block diagram of the image adjusting apparatus 80. The image adjusting apparatus 80 includes a first multiplying module 81, an adding module 82, a second multiplying module 83 and a dividing module 84. The first multiplying module 81 is used multiplying the target gray level with a sharpness index to generate an amplified target gray level and respectively multiplying each of the adjacent gray levels with an adjacent index to generate N modified adjacent gray levels. The sharpness index and the adjacent index are related to the spatial mask. The adding module 82 adds up the amplified target gray level and the N modified adjacent gray levels to generate a first gray level sum. The second multiplying module 83 then multiplies the first gray level sum with a multiplying parameter to generate a second gray level sum, wherein the multiplying parameter is related to the spatial mask. The dividing module 84 divides the second gray level sum by a dividing parameter to generate an adjusted gray level for the target pixel, wherein the dividing parameter is related to the spatial mask.

In actual applications, the image adjusting apparatus 80 can further include a look-up table 85. According to this invention, plural candidate spatial masks are previously provided. Each of the candidate spatial masks respectively corresponds to a candidate sharpness index, a candidate adjacent index, a candidate multiplying parameter, and a candidate dividing parameter. The look-up table 85 is used for storing the candidate sharpness indexes, the candidate adjacent indexes, the candidate multiplying parameters and the candidate dividing parameters. The spatial mask for the target pixel is one of the candidate spatial masks. The sharpness index and the adjacent index used in the first multiplying module 81, the multiplying parameter used in the second multiplying module 83 and the dividing parameter used in the dividing module 84 are all selected from the look-up table 85 according to the spatial mask.

Figure 9:
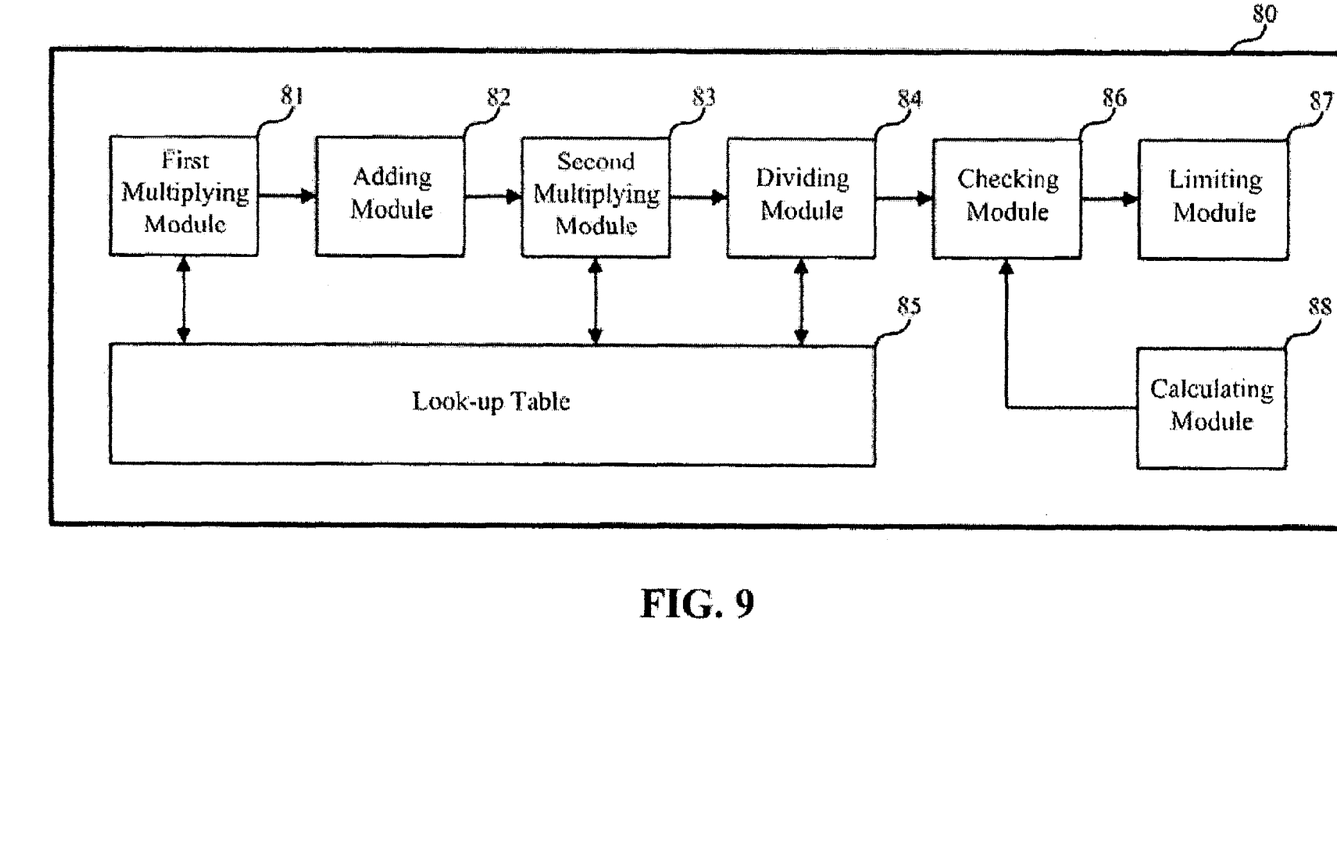
FIG. 9 illustrates the block diagram of the fourth preferred embodiment according to this invention.

As shown in FIG. 9, the image adjusting apparatus 80 can also further include a checking module 86, a limiting module 87 and a calculating module 88. The checking module 86 is used for checking whether the adjusted gray level is larger than a maximum threshold or smaller than a minimum threshold. If the adjusted gray level is larger than the maximum threshold, the limiting module 87 then sets the adjusted gray level as the maximum threshold. If the adjusted gray level is smaller than the minimum threshold, the limiting module 87 then sets the adjusted gray level as the minimum threshold. The calculating module 88 is used for determining the maximum threshold and the minimum threshold based on the target gray level and the N adjacent gray levels. Accordingly, the image adjusting apparatus 80 can not only adjust the sharpness of an image, but also lessen the side effects due to over-sharpening.

One of the advantages of this invention is capable of performing a multi-level sharpening process with simple multiplying/dividing circuits. Moreover, this invention can lessen side effects after the sharpening process.

With the above example and explanation, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for adjusting a target gray level of a target pixel based on a spatial mask, the target pixel being surrounded with N adjacent pixels, N being a positive integer, each of the N adjacent pixels respectively having an adjacent gray level, said method comprising the steps of:
    (a) using an image adjustment apparatus multiplying the target gray level with a sharpness index to generate an amplified target gray level and respectively multiplying each of the adjacent gray levels with an adjacent index to generate N modified adjacent gray levels, wherein the sharpness index and the adjacent index are related to the spatial mask;
    (b) adding up the amplified target gray level and the N modified adjacent gray levels to generate a first gray level sum;
    (c) multiplying the first gray level sum with a multiplying parameter to generate a second gray level sum, wherein the multiplying parameter is related to the spatial mask; and
    (d) dividing the second gray level sum by a dividing parameter to generate an adjusted gray level for the target pixel, wherein the dividing parameter is related to the spatial mask.

2. The method of claim 1, wherein the dividing parameter is a power of 2.

3. The method of claim 1, wherein the adjacent index is equal to (−1).

4. The method of claim 3, wherein the difference between the sharpness index and N is equal to the integer part of the result of dividing the dividing parameter by the multiplying parameter.

5. The method of claim 1, said method further comprising the steps of:
    (e1) checking whether the adjusted gray level is larger than a maximum threshold or smaller than a minimum threshold;
    (e2) if the adjusted gray level is larger than the maximum threshold, setting the adjusted gray level as the maximum threshold; and
    (e3) if the adjusted gray level is smaller than the minimum threshold, setting the adjusted gray level as the minimum threshold.

6. The method of claim 5, wherein the maximum threshold and the minimum threshold are respectively relative to the target gray level and the N adjacent gray levels.

7. The method of claim 6, wherein a maximum gray level ($K_{max}$) and a minimum gray level ($K_{min}$) are selected from the target gray level and the N adjacent gray levels, the maximum threshold is equal to $[(1+C)*K_{max}]$, and the minimum threshold is equal to $[(1-C)*K_{min}]$, wherein C is a limitation parameter relative to the target gray level and the N adjacent gray levels.

8. The method of claim 1, wherein a plurality of candidate spatial masks are previously provided, each of the candidate spatial masks respectively corresponds to a candidate sharpness index, a candidate adjacent index, a candidate multiplying parameter, and a candidate dividing parameter, a look-up table is used for storing the candidate sharpness indexes, the candidate adjacent indexes, the candidate multiplying parameters and the candidate dividing parameters, the spatial mask for the target pixel is one of the candidate spatial masks, the sharpness index and the adjacent index in step (a), the multiplying parameter in step (c) and the dividing parameter in step (d) are selected from said look-up table according to the spatial mask.

9. An apparatus for adjusting a target gray level of a target pixel based on a spatial mask, the target pixel being surrounded with N adjacent pixels, N being a positive integer, each of the N adjacent pixels respectively having an adjacent gray level, said apparatus comprising:
    a first multiplying module for multiplying the target gray level with a sharpness index to generate an amplified target gray level and respectively multiplying each of the adjacent gray levels with an adjacent index to generate N modified adjacent gray levels, wherein the sharpness index and the adjacent index are related to the spatial mask;
    an adding module for adding up the amplified target gray level and the N modified adjacent gray levels to generate a first gray level sum;
    a second multiplying module for multiplying the first gray level sum with a multiplying parameter to generate a second gray level sum, wherein the multiplying parameter is related to the spatial mask; and
    a dividing module for dividing the second gray level sum by a dividing parameter to generate an adjusted gray level for the target pixel, wherein the dividing parameter is related to the spatial mask.

10. The apparatus of claim 9, wherein the dividing parameter is a power of 2.

11. The apparatus of claim 9, wherein the adjacent index is equal to (−1).

12. The apparatus of claim 11, wherein the difference between the sharpness index and N is equal to the integer part of the result of dividing the dividing parameter by the multiplying parameter.

13. The apparatus of claim 9, said apparatus further comprising:
    a checking module for checking whether the adjusted gray level is larger than a maximum threshold or smaller than a minimum threshold; and
    a limiting module, if the adjusted gray level is larger than the maximum threshold, the limiting module setting the adjusted gray level as the maximum threshold, and if the adjusted gray level is smaller than the minimum threshold, the limiting module setting the adjusted gray level as the minimum threshold.

14. The apparatus of claim 13, said apparatus further comprising:
a calculating module for determining the maximum threshold and the minimum threshold based on the target gray level and the N adjacent gray levels.

15. The apparatus of claim 14, wherein the calculating module calculates the maximum threshold according to the following formula:

maximum threshold=$[(1+C)*K_{max}]$, and the calculating module calculates the minimum threshold according to the following formula:

minimum threshold=$[(1-C)*K_{min}]$, wherein $K_{max}$ is the maximum gray level among the target gray level and the N adjacent gray levels, $K_{min}$ is the minimum gray level among the target gray level and the N adjacent gray levels, and C is a limitation parameter relative to the target gray level and the N adjacent gray levels.

16. The apparatus of claim 9, said apparatus further comprising:
a look-up table, a plurality of candidate spatial masks being previously provided, each of the candidate spatial masks respectively corresponding to a candidate sharpness index, a candidate adjacent index, a candidate multiplying parameter, and a candidate dividing parameter, said look-up table being used for storing the candidate sharpness indexes, the candidate adjacent indexes, the candidate multiplying parameters and the candidate dividing parameters, the spatial mask for the target pixel being one of the candidate spatial masks, the sharpness index and the adjacent index used in the first multiplying module, the multiplying parameter used in the second multiplying module and the dividing parameter used in the dividing module being selected from said look-up table according to the spatial mask.

17. A method for adjusting a sharpened gray level of a target pixel, the target pixel being surrounded with N adjacent pixels, N being a positive integer, each of the N adjacent pixels respectively having an adjacent gray level, the sharpened gray level being generated based on an original gray level of the target pixel and the N adjacent gray levels, said method comprising the steps of:
checking whether the sharpened gray level is larger than a maximum threshold or smaller than a minimum threshold; and
if the sharpened gray level is larger than the maximum threshold, using an image adjustment apparatus setting the sharpened gray level as the maximum threshold, and if the sharpened gray level is smaller than the minimum threshold, setting the sharpened gray level as the minimum threshold.

18. The method of claim 17, wherein the maximum threshold and the minimum threshold are relative to the original gray level and the N adjacent gray levels.

19. The method of claim 18, wherein a maximum gray level ($K_{max}$) and a minimum gray level ($K_{min}$) are selected from the original gray level and the N adjacent gray levels, the maximum threshold is equal to $[(1+C)*K_{max}]$, and the minimum threshold is equal to $[(1-C)*K_{min}]$, wherein C is a limitation parameter relative to the original gray level and the N adjacent gray levels.

20. An apparatus for adjusting a sharpened gray level of a target pixel, the target pixel being surrounded with N adjacent pixels, N being a positive integer, each of the N adjacent pixels respectively having an adjacent gray level, the sharpened gray level being generated based on an original gray level of the target pixel and the N adjacent gray levels, said apparatus comprising:
a checking module for checking whether the sharpened gray level is larger than a maximum threshold or smaller than a minimum threshold; and
a limiting module, if the sharpened gray level is larger than the maximum threshold, the limiting module setting the adjusted gray level as the maximum threshold, and if the sharpened gray level is smaller than the minimum threshold, the limiting module setting the adjusted gray level as the minimum threshold.

21. The apparatus of claim 20, wherein the maximum threshold and the minimum threshold are relative to the original gray level and the N adjacent gray levels.

22. The apparatus of claim 21, wherein a maximum gray level ($K_{max}$) and a minimum gray level ($K_{min}$) are selected from the original gray level and the N adjacent gray levels, the maximum threshold is equal to $[(1+C)*K_{max}]$, and the minimum threshold is equal to $[(1-C)*K_{min}]$, wherein C is a limitation parameter relative to the original gray level and the N adjacent gray levels.

* * * * *